(12) United States Patent
Womack et al.

(10) Patent No.: US 8,848,594 B2
(45) Date of Patent: Sep. 30, 2014

(54) METHOD AND APPARATUS FOR DISCOVERY OF RELAY NODES

(75) Inventors: James Earl Womack, Bedford, TX (US); Zhijun Cai, Euless, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 373 days.

(21) Appl. No.: 12/331,992

(22) Filed: Dec. 10, 2008

(65) Prior Publication Data

US 2010/0142433 A1    Jun. 10, 2010

(51) Int. Cl.
| | | |
|---|---|---|
| H04B 7/14 | (2006.01) | |
| H04W 48/16 | (2009.01) | |
| H04W 8/26 | (2009.01) | |
| H04W 84/04 | (2009.01) | |
| H04B 7/26 | (2006.01) | |

(52) U.S. Cl.
CPC ............... *H04W 48/16* (2013.01); *H04W 8/26* (2013.01); *H04W 84/047* (2013.01); *H04B 7/2606* (2013.01)
USPC ........................................................ 370/315

(58) Field of Classification Search
CPC ............... H04B 7/2606; H04W 88/04; H04W 36/0016; H04W 36/0083; H04W 48/16; H04W 84/047; H04W 8/26
USPC ......... 370/315, 279, 293, 331–334, 374, 492, 370/274; 375/211–215; 455/7, 436–442
See application file for complete search history.

(56) References Cited

U.S. PATENT DOCUMENTS

| | | |
|---|---|---|
| 6,014,375 A | 1/2000 | Janky |
| 6,512,745 B1 | 1/2003 | Abe et al. |
| 6,690,657 B1 | 2/2004 | Lau et al. |
| 6,785,510 B2 | 8/2004 | Larsen |
| 7,054,633 B2 | 5/2006 | Seo et al. |
| 7,061,879 B2 | 6/2006 | Oprescu-Surcobe et al. |
| 7,130,614 B2 | 10/2006 | Sreemanthula et al. |

(Continued)

FOREIGN PATENT DOCUMENTS

| | | |
|---|---|---|
| CN | 1941666 A | 4/2007 |
| CN | 1960352 A | 5/2007 |

(Continued)

OTHER PUBLICATIONS

3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.

(Continued)

*Primary Examiner* — Mark Rinehart
*Assistant Examiner* — Mang Yeung
(74) *Attorney, Agent, or Firm* — Conley Rose, P.C.; J. Robert Brown, Jr.

(57) ABSTRACT

A method for determining a presence of a relay node in a wireless communications system. The method includes receiving, from a network node in the system, information indicating the presence of at least one of an access node and the relay node. The method further includes determining whether the network node is the one of the access node and the relay node based on the information.

13 Claims, 4 Drawing Sheets

(56) References Cited

U.S. PATENT DOCUMENTS

| | | |
|---|---|---|
| 7,227,851 B1 | 6/2007 | Gopalakrishnan et al. |
| 7,349,665 B1 | 3/2008 | Zhu et al. |
| 7,386,036 B2 | 6/2008 | Pasanen et al. |
| 7,564,827 B2 | 7/2009 | Das et al. |
| 7,577,124 B2 | 8/2009 | Yomo et al. |
| 7,602,843 B2 | 10/2009 | Cho et al. |
| 7,673,211 B2 | 3/2010 | Meyer et al. |
| 7,706,408 B2 | 4/2010 | Takagi et al. |
| 7,724,767 B2* | 5/2010 | Oksman ............ 370/458 |
| 7,742,448 B2 | 6/2010 | Ramachandran et al. |
| 7,830,837 B2 | 11/2010 | Park et al. |
| 7,873,002 B2 | 1/2011 | Cai |
| 7,898,948 B2 | 3/2011 | DiGirolamo et al. |
| 8,072,918 B2 | 12/2011 | Muharemovic et al. |
| 8,121,552 B2 | 2/2012 | Agami et al. |
| 8,228,851 B2 | 7/2012 | Wu |
| 8,234,534 B2 | 7/2012 | Park et al. |
| 8,265,016 B2 | 9/2012 | Xu |
| 8,281,211 B2 | 10/2012 | Wang et al. |
| 8,391,202 B2 | 3/2013 | Courseille |
| 8,428,016 B2 | 4/2013 | Bhattad et al. |
| 2002/0032032 A1 | 3/2002 | Haumont et al. |
| 2002/0155839 A1 | 10/2002 | Nisbet |
| 2002/0187746 A1 | 12/2002 | Cheng et al. |
| 2003/0096631 A1 | 5/2003 | Kayama et al. |
| 2003/0103480 A1 | 6/2003 | You et al. |
| 2004/0042492 A1 | 3/2004 | Suzuki et al. |
| 2004/0063451 A1 | 4/2004 | Bonta et al. |
| 2004/0266339 A1 | 12/2004 | Larsson |
| 2005/0014464 A1 | 1/2005 | Larsson |
| 2005/0037798 A1 | 2/2005 | Yamashita et al. |
| 2005/0042987 A1 | 2/2005 | Lee et al. |
| 2005/0148311 A1 | 7/2005 | Anderson |
| 2005/0232212 A1 | 10/2005 | Kang et al. |
| 2006/0183421 A1 | 8/2006 | Proctor, Jr. et al. |
| 2006/0239455 A1 | 10/2006 | Kato |
| 2007/0002766 A1 | 1/2007 | Park et al. |
| 2007/0058661 A1 | 3/2007 | Chow |
| 2007/0070953 A1 | 3/2007 | Yoon et al. |
| 2007/0081483 A1 | 4/2007 | Jang et al. |
| 2007/0082621 A1 | 4/2007 | Lee et al. |
| 2007/0097945 A1* | 5/2007 | Wang et al. ............ 370/349 |
| 2007/0104148 A1 | 5/2007 | Kang et al. |
| 2007/0153734 A1 | 7/2007 | Lee et al. |
| 2007/0155315 A1 | 7/2007 | Lee et al. |
| 2007/0171925 A1 | 7/2007 | Tanimoto |
| 2007/0206531 A1 | 9/2007 | Pajukoski et al. |
| 2007/0230605 A1 | 10/2007 | Osseiran et al. |
| 2007/0253421 A1 | 11/2007 | Cai |
| 2007/0274250 A1* | 11/2007 | Chen et al. ............ 370/328 |
| 2007/0287476 A1 | 12/2007 | Jeong et al. |
| 2007/0291696 A1 | 12/2007 | Zhang et al. |
| 2008/0002610 A1 | 1/2008 | Zheng et al. |
| 2008/0025248 A1 | 1/2008 | Naden |
| 2008/0025323 A1 | 1/2008 | Khan |
| 2008/0043671 A1 | 2/2008 | Moon et al. |
| 2008/0043710 A1 | 2/2008 | Zhou et al. |
| 2008/0056173 A1 | 3/2008 | Watanabe |
| 2008/0081628 A1 | 4/2008 | Ye et al. |
| 2008/0089282 A1* | 4/2008 | Malladi et al. ............ 370/329 |
| 2008/0101306 A1 | 5/2008 | Bertrand et al. |
| 2008/0101498 A1 | 5/2008 | Han et al. |
| 2008/0102794 A1 | 5/2008 | Keevill et al. |
| 2008/0107072 A1* | 5/2008 | Viorel et al. ............ 370/329 |
| 2008/0107076 A1 | 5/2008 | Ramachandran et al. |
| 2008/0107078 A1* | 5/2008 | Viorel et al. ............ 370/331 |
| 2008/0108303 A1 | 5/2008 | Okuda |
| 2008/0108304 A1 | 5/2008 | Suga |
| 2008/0159337 A1 | 7/2008 | Lee |
| 2008/0165776 A1 | 7/2008 | Tao et al. |
| 2008/0174470 A1 | 7/2008 | Lum et al. |
| 2008/0212513 A1 | 9/2008 | Tao et al. |
| 2008/0225765 A1 | 9/2008 | Marinier et al. |
| 2008/0225772 A1 | 9/2008 | Xu |
| 2008/0227449 A1 | 9/2008 | Gholmieh et al. |
| 2008/0227461 A1 | 9/2008 | Dayal et al. |
| 2008/0232284 A1 | 9/2008 | Dalsgaard et al. |
| 2008/0232493 A1* | 9/2008 | Zhang et al. ............ 375/260 |
| 2008/0247375 A1 | 10/2008 | Muharemovic et al. |
| 2008/0285500 A1 | 11/2008 | Zhang et al. |
| 2008/0285501 A1 | 11/2008 | Zhang et al. |
| 2008/0293358 A1 | 11/2008 | Andersson et al. |
| 2008/0310389 A1 | 12/2008 | Suzuki et al. |
| 2008/0311904 A1 | 12/2008 | Courseille |
| 2009/0010199 A1* | 1/2009 | Adachi et al. ............ 370/315 |
| 2009/0046641 A1 | 2/2009 | Wang et al. |
| 2009/0061892 A1* | 3/2009 | Lee et al. ............ 455/456.1 |
| 2009/0061920 A1 | 3/2009 | Horiuchi et al. |
| 2009/0111476 A1 | 4/2009 | Hamalainen et al. |
| 2009/0116423 A1 | 5/2009 | Ni et al. |
| 2009/0154533 A1 | 6/2009 | Khayrallah et al. |
| 2009/0190522 A1* | 7/2009 | Horn et al. ............ 370/315 |
| 2009/0191882 A1 | 7/2009 | Kovacs et al. |
| 2009/0196332 A1 | 8/2009 | Miyatani |
| 2009/0239568 A1 | 9/2009 | Bertrand et al. |
| 2009/0252079 A1 | 10/2009 | Zhang et al. |
| 2009/0252088 A1 | 10/2009 | Rao et al. |
| 2009/0264077 A1 | 10/2009 | Damnjanovic |
| 2009/0276672 A1 | 11/2009 | Lee et al. |
| 2009/0291679 A1 | 11/2009 | Wu |
| 2009/0303918 A1 | 12/2009 | Ma et al. |
| 2009/0313518 A1 | 12/2009 | Shen et al. |
| 2009/0325480 A1 | 12/2009 | Ji et al. |
| 2009/0325618 A1 | 12/2009 | Aiba et al. |
| 2010/0003977 A1 | 1/2010 | Pinheiro et al. |
| 2010/0005351 A1 | 1/2010 | Ahn et al. |
| 2010/0027457 A1 | 2/2010 | Okuda |
| 2010/0027458 A1 | 2/2010 | Wu et al. |
| 2010/0039947 A1 | 2/2010 | Li et al. |
| 2010/0046413 A1 | 2/2010 | Jin et al. |
| 2010/0046418 A1 | 2/2010 | Horn et al. |
| 2010/0056197 A1 | 3/2010 | Attar et al. |
| 2010/0061361 A1 | 3/2010 | Wu |
| 2010/0074209 A1 | 3/2010 | Montojo et al. |
| 2010/0080166 A1 | 4/2010 | Palanki et al. |
| 2010/0091759 A1 | 4/2010 | Stahl et al. |
| 2010/0098045 A1 | 4/2010 | Miyazaki |
| 2010/0103845 A1 | 4/2010 | Ulupinar et al. |
| 2010/0110967 A1 | 5/2010 | Sartori et al. |
| 2010/0120442 A1 | 5/2010 | Zhuang et al. |
| 2010/0131814 A1 | 5/2010 | Chiu |
| 2010/0135231 A1 | 6/2010 | Harada et al. |
| 2010/0135251 A1 | 6/2010 | Sambhwani et al. |
| 2010/0182992 A1 | 7/2010 | Chun et al. |
| 2010/0184434 A1 | 7/2010 | Jeong et al. |
| 2010/0202307 A1 | 8/2010 | Lee et al. |
| 2010/0271999 A1 | 10/2010 | Yu et al. |
| 2010/0297993 A1 | 11/2010 | Heo et al. |
| 2010/0302998 A1 | 12/2010 | Bao et al. |
| 2010/0322145 A1 | 12/2010 | Yu et al. |
| 2010/0322194 A1 | 12/2010 | Hu et al. |
| 2010/0323612 A1 | 12/2010 | Xu et al. |
| 2010/0323614 A1 | 12/2010 | Yu et al. |
| 2010/0323684 A1 | 12/2010 | Cai et al. |
| 2010/0325506 A1 | 12/2010 | Cai et al. |
| 2011/0026409 A1 | 2/2011 | Hu et al. |
| 2011/0041027 A1 | 2/2011 | Fong et al. |
| 2011/0092212 A1 | 4/2011 | Kubota |
| 2011/0110258 A1 | 5/2011 | Ishii et al. |
| 2011/0261763 A1 | 10/2011 | Chun et al. |
| 2011/0317648 A1* | 12/2011 | Lee et al. ............ 370/329 |

FOREIGN PATENT DOCUMENTS

| | | |
|---|---|---|
| CN | 101047431 A | 10/2007 |
| CN | 101141171 A | 3/2008 |
| CN | 101217337 A | 7/2008 |
| CN | 101222299 A | 7/2008 |
| CN | 101257492 A | 9/2008 |
| CN | 101296060 A | 10/2008 |
| EP | 1534035 A1 | 5/2005 |
| EP | 1773091 A2 | 4/2007 |
| EP | 1775983 A1 | 4/2007 |
| EP | 1883178 A2 | 1/2008 |

(56) References Cited

FOREIGN PATENT DOCUMENTS

| | | |
|---|---|---|
| EP | 1890402 A2 | 2/2008 |
| EP | 1919234 A2 * | 5/2008 |
| EP | 1924009 A1 | 5/2008 |
| EP | 1940185 A1 | 7/2008 |
| EP | 1959708 A1 | 8/2008 |
| EP | 1995921 A2 | 11/2008 |
| EP | 2242306 A1 | 10/2010 |
| JP | 2004328665 A | 11/2004 |
| JP | 2006311253 A | 11/2006 |
| JP | 2007312244 A | 11/2007 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118651 A | 5/2008 |
| JP | 2008118652 A | 5/2008 |
| JP | 2008131649 A | 6/2008 |
| JP | 2008167141 A | 7/2008 |
| JP | 2008172754 A | 7/2008 |
| JP | 2008172759 A | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009188926 A | 8/2009 |
| JP | 2009531898 A | 9/2009 |
| JP | 2009539299 A | 11/2009 |
| JP | 2010504665 A | 2/2010 |
| JP | 2010506447 A | 2/2010 |
| JP | 2010103638 A | 5/2010 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | WO 2007048247 A1 * | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008034335 A1 | 3/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A1 | 8/2008 |
| WO | WO 2008103981 A2 * | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Panasonic; 3GPP TSG RAN WG1 Meeting #54; Title: Discussion on the Various Types of Relays; R1-082397; Warsaw, Poland; Jun. 30-Jul. 4, 2008; 6 pgs.

Research in Motion, Limited; 3GPP TSG RAN WG1 Meeting #55; Title: L2 Relay Interference Mitigation; R1-084102; Prague, Czech Republic; Nov. 10-14, 2008; 6 pgs.

Research in Motion, Limited; 3GPP TSG RAN WG1 Meeting #55-bis; Title: Relay Control Signalling Resource Coordination; R1-090027; Ljubljana, Slovenia; Jan. 12-16, 2009; 3 pgs.

PCT International Search Report; PCT Application No. PCT/US2009/062551; Jan. 28, 2010; 4 pgs.

PCT Written Opinion of the International Searching Authority; PCT Application No. PCT/US2009/062551; Jan. 28, 2010; 5 pgs.

PCT Communication Relating to the Results of the Partial International Search; PCT Application No. PCT/US2009/062554; Mar. 2, 2010; 7 pgs.

PCT International Search Report; PCT Application No. PCT/US2009/062557; Feb. 10, 2010; 4 pgs.

PCT Written Opinion of the International Searching Authority; PCT Application No. PCT/US2009/062557; Feb. 10, 2010; 7 pgs.

PCT International Search Report; PCT Application No. PCT/US2009/062560; Mar. 1, 2010; 4 pgs.

PCT Written Opinion of the International Searching Authority; PCT Application No. PCT/US2009/062560; Mar. 1, 2010; 7 pgs.

PCT International Search Report; PCT Application No. PCT/US2009/062570; Feb. 22, 2010; 4 pgs.

PCT Written Opinion of the International Searching Authority; PCT Application No. PCT/US2009/062570; Feb. 22, 2010; 8 pgs.

PCT Communication Relating to the Results of the Partial International Search; PCT Application No. PCT/US2009/062571; Feb. 12, 2010; 6 pgs.

PCT International Search Report; PCT Application No. PCT/US2009/064398; Mar. 18, 2010; 5 pgs.

PCT Written Opinion of the International Searching Authority; PCT Application No. PCT/US2009/064398; Mar. 18, 2010; 9 pgs.

Parkvall, Stefan, et al., The Evolution of WCDMA Towards Higher Speed Downlink Packet Data Access, XP-001082550, IEEE VTC, 2001, pp. 2287-2291.

Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.

PCT International Search Report; PCT Application No. PCT/US2009/062554; May 12, 2010; 6 pgs.

PCT Written Opinion of the International Searching Authority; PCT Application No. PCT/US2009/062554; May 12, 2010; 7 pgs.

PCT International Search Report; PCT Application No. PCT/US2009/062571; Apr. 19, 2010; 6 pgs.

PCT Written Opinion of the International Searching Authority; PCT Application No. PCT/US2009/062571; Apr. 19, 2010; 6 pgs.

PCT Communication Invitation to Pay Additional Fees and, Where Applicable, Protest Fee; PCT Application No. PCT/US2009/062574; Apr. 22, 2010; 8 pgs.

Office Action dated May 26, 2010, 20 pages, U.S. Appl. No. 12/337,214, filed Dec. 17, 2008.

3GPP TR 36.814v0.4.1; 3rd Generation Partnership Project; Technical Specification Group Radio Access Network; Further Advancements for E-UTRA Physical Layer Aspects; Release 9; Feb. 2009; 31 pgs.

Motorola; Title: Classification of Relays; TSG-RAN WG1 #54; R1-083223; Jeju, South Korea; Aug. 18-22, 2008; 3 pgs.

PCT International Search Report; PCT Application No. PCT/US2009/030967; Sep. 8, 2009; 5 pgs.

PCT Written Opinion of the International Searching Authority; PCT Application No. PCT/US2009/030967; Sep. 8, 2009; 9 pgs.

Womack, James Earl, et al.; U.S. Appl. No. 12/340,418, filed Dec. 19, 2008; Title: System and Method for Relay Node Selection.

Yu, Yi, et al.; U.S. Appl. No. 12/337,229, filed Dec. 17, 2008; Title: System and Method for Hybrid Automatic Repeat Request (HARQ) Functionality in a Relay Node.

Cai, Zhijun, et al.; U.S. Appl. No. 12/340,412, filed Dec. 19, 2008; Title: System and Method for Resource Allocation Yu, Yi, et al.; U.S. Appl. No. 12/337,207, filed Dec. 17, 2008; Title: System and Method for Multi-User Multiplexing Womack, James Earl, et al.; U.S. Appl. No. 12/337,235, filed Dec. 17, 2008; Title: System and Method for Initial Access to Relays.

(56) References Cited

OTHER PUBLICATIONS

Cai, Zhijun, et al.; U.S. Appl. No. 12/337,214, filed Dec. 17, 2008; Title: System and Method for Autonomous Combining.
Yu, Yi, et al.; U.S. Appl. No. 12/340,432, filed Dec. 19, 2008; Title: Multiple-Input Multiple-Output (MIMO) with Relay Nodes.
Cai, Zhijun, et al.; U.S. Appl. No. 12/337,222, filed Dec. 17, 2008; Title: System and Method for a Relay Protocol Stack.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; 28 pgs.
3GPP TS 36.321 v8.3.0; 3rd Generation Partnership Porject; Technical Specification Group Radio Access Network; Evolved Universal Terrestrial Radio Access (E-UTRA) Medium Access Control (MAC) Protocol Specification; Release 8; Sep. 2008; 36 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Ericsson; TSG-RAN WG1 #53; Title: A Discussion on Some Technology Components for LTE-Advanced; R1-082024; Kansas City, Missiouri; May 5-9, 2008; 11 pgs.
3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pgs.
Soldani, David, et al.; Title: Wireless Relays for Broadband Access; IEEE Communications Magazine; Mar. 2008. pp. 58-66.
Pabst, Ralf et al.; Title: Relay-Based Deployment Concepts for Wireless and Mobile Broadband Radio; IEEE Communications Magazine; Sep. 2004; pp. 80-89.
Cai, Zhijun, et al.; U.S. Appl. No. 12/916,214, filed Oct. 29, 2010; Title: System and Method for Autonomous Combining.
Office Action dated Jul. 12, 2010, 40 pages, U.S. Appl. No. 12/337,207, filed Dec. 17, 2008.
Notice of Allowance dated Nov. 8, 2010, 10 pages, U.S. Appl. No. 12/337,214, filed Dec. 17, 2008.
Office Action dated Aug. 17, 2010, 25 pages, U.S. Appl. No. 12/337,222, filed Dec. 17, 2008.
PCT International Preliminary Report on Patentability; PCT Application No. PCT/US2009/062571; Mar. 10, 2011; 8 pgs.
Office Action dated Jan. 25, 2011, 39 pages, U.S. Appl. No. 12/337,207, filed Dec. 17, 2008.
Notice of Allowance dated Mar. 25, 2011, 11 pages, U.S. Appl. No. 12/337,214, filed Dec. 17, 2008.
Final Office Action dated Jan. 14, 2011, 16 pages, U.S. Appl. No. 12/337,222, filed Dec. 17, 2008.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
Cai, Zhijun, et al.; U.S. Appl. No. 13/221,584, filed Aug. 30, 2011; Title: System and Method for Autonomous Combining.
Office Action dated Jul. 21, 2011; U.S. Appl. No. 12/340,418, filed Dec. 19, 2008; 34 pgs.
Office Action dated Jun. 16, 2011; U.S. Appl. No. 12/340,412, filed Dec. 19, 2008, 33 pgs.
Office Action dated Jul. 13, 2011; U.S. Appl. No. 12/337,207, filed Dec. 17, 2008; 34 pgs.
Office Action dated Jul. 22, 2011; U.S. Appl. No. 12/337,235, filed Dec. 17, 2008; 36 pgs.
Notice of Allowance dated May 27, 2011; U.S. Appl. No. 12/337,214, filed Dec. 17, 2008; 10 pgs.
Office Action dated Jul. 18, 2011; U.S. Appl. No. 12/340,432, filed Dec. 19, 2008; 6 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report on Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report on Patentability; PCT Application No. PCT/US2009/062557; Jun. 21, 2011; 7 pgs.
PCT International Preliminary Report on Patentability; PCT Application No. PCT/US2009/062560; Jun. 21, 2011; 8 pgs.
PCT International Preliminary Report on Patentability; PCT Application No. PCT/US2009/062570; Jun. 21, 2011; 9 pgs.
PCT International Preliminary Report on Patentability; PCT Application No. PCT/US2009/062574; Jun. 21, 2011; 10 pgs.
PCT International Preliminary Report on Patentability; PCT Application No. PCT/US2009/064398; Jun. 21, 2011; 10 pgs.
Notice of Allowance dated Nov. 25, 2013; U.S. Appl. No. 13/216,819, filed Aug. 24, 2011; 16 pages.
Final Office Action dated Nov. 20, 2013; U.S. Appl. No. 12/337,222, filed Dec. 17, 2008; 28 pgs.
Advisory Action dated Dec. 6, 2013; U.S. Appl. No. 13/221,583, filed Aug. 30, 2011; 3 pages.
Office Action dated Dec. 20, 2013; U.S. Appl. No. 13/865,810, filed Apr. 18, 2013. 72 pages.
Chinese Office Action; Application No. 200980156892.1; Dec. 31, 2013; 16 pages.
Japanese Office Action; Application No. 2011-542165; Nov. 6, 2013; 5 pages.
Cai, Zhijun, et al.; U.S. Appl. No. 13/716,839, filed Dec. 17, 2012; Title: System and Method for Resource Allocation.
Notice of Allowance dated Jan. 17, 2013; U.S. Appl. No. 12/340,418, filed Dec. 19, 2008; 25 pgs.
Final Office Action dated Jan. 24, 2013; U.S. Appl. No. 13/548,807, filed Jul. 13, 2012; 33 pages.
Office Action dated Jan. 31, 2013; U.S. Appl. No. 13/221,583, filed Aug. 30, 2011; 69 pgs.
Office Action dated Feb. 5, 2013; U.S. Appl. No. 13/221,584, filed Aug. 30, 2011; 65 pages.

(56) References Cited

OTHER PUBLICATIONS

Japanese Office Action; Application No. 2011-542163; Dec. 18, 2012; 7 pages.
Yu, Yi, et al.; U.S. Appl. No. 13/842,584, filed Mar. 15, 2013; Title: System and Method for Hybrid Automatic Repeat Request (HARQ) Functionality in a Relay Node.
Womack, James Earl, et al.; U.S. Appl. No. 13/864,810, filed Apr. 18, 2013; Title: System and Method for Relay Node Selection.
Advisory Action dated Apr. 12, 2013; U.S. Appl. No. 13/548,817, filed Jul. 13, 2012; 8 pages.
Office Action dated Apr. 18, 2013; U.S. Appl. No. 13/216,819, filed Aug. 25, 2011; 37 pgs.
Office Action dated May 29, 2013; U.S. Appl. No. 12/337,222, filed Dec. 17, 2008; 26 pgs.
Office Action dated May 10, 2013; U.S. Appl. No. 13/221,583, filed Aug. 30, 2011; 21 pgs.
Final Office Action dated May 14, 2013; U.S. Appl. No. 13/221,584, filed Aug. 30, 2011; 15 pages.
Canadian Office Action; Application No. 2,746,635; Apr. 18, 2013; 3 pages.
Korean Office Action; Application No. 10-2011-7015882; Mar. 21, 2013; 7 pages.
Canadian Office Action; Application No. 2,747,593; May 24, 2013; 3 pages.
Canadian Office Action; Application No. 2,747,339; May 1, 2013; 2 pages.
Korean Office Action; Application No. 10-2011-7016626; May 20, 2013; 5 pages.
Canadian Office Action; Application No. 2,747,625; May 3, 2013; 3 pages.
European Examination Report; Application No. 09761065.3; May 16, 2013; 3 pages.
Canadian Office Action; Application No. 2,747,343; May 24, 2013; 3 pages.
Canadian Office Action; Application No. 2,750,828; Apr. 4, 2013; 4 pages.
Japanese Office Action; Application No. 2011-542177; Apr. 26, 2013; 12 pages.
Office Action dated Mar. 21, 2012; U.S. Appl. No. 12/337,229, filed Dec. 17, 2008; 49 pages.
Notice of Allowance dated Jun. 12, 2012; U.S. Appl. No. 12/337,207, filed Dec. 17, 2008; 20 pages.
Advisory Action dated Mar. 22, 2012; U.S. Appl. No. 12/337,235, filed Dec. 17, 2008; 10 pages.
Final Office Action dated Mar. 23, 2012; U.S. Appl. No. 12/340,432, filed Dec. 19, 2008; 28 pgs.
Final Office Action dated Apr. 19, 2012; U.S. Appl. No. 13/216,819, filed Aug. 25, 2011; 39 pgs.
Final Office Action dated Jun. 7, 2012; U.S. Appl. No. 12/337,222, filed Dec. 17, 2008; 16 pgs.
Australian Examination Report; Application No. 2009325082; Mar. 28, 2012; 3 pages.
European Examination Report; Application No. 09748915.7; May 14, 2012; 3 pages.
European Examination Report; Application No. 09761065.3; May 7, 2012; 4 pages.
Chinese Office Action; Application No. 200980149651.4; Aug. 23, 2013; 14 pages.
Japanese Office Action; Application No. 2011-542161; Aug. 29, 2013; 7 pages.
Chinese Office Action; Application No. 200980156928.6; Sep. 23, 2013; 15 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity—Part I: System Description"; IEEE Transactions on Communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Office Action dated Oct. 2, 2012; U.S. Appl. No. 12/340,418, filed Dec. 19, 2008; 29 pgs.
Office Action dated Oct. 12, 2012; U.S. Appl. No. 13/548,807, filed Jul. 13, 2012; 53 pages.
Final Office Action dated Nov. 27, 2012; U.S. Appl. No. 12/916,214, filed Oct. 29, 2010; 16 pages.
Office Action dated Dec. 3, 2012; U.S. Appl. No. 12/337,222, filed Dec. 17, 2008; 24 pgs.
Japanese Office Action; Application No. 2011-540716; Oct. 4, 2012; 15 pages.
Korean Office Action; Application No. 10-2011-7015882; Sep. 18, 2012; 10 pages.
Japanese Office Action; Application No. 2011-542161; Nov. 1, 2012; 17 pages.
Korean Office Action; Application No. 10-2011-7016626; Oct. 26, 2012; 8 pages.
Japanese Office Action; Application No. 2011-542162; Oct. 17, 2012; 10 pages.
Japanese Office Action; Application No. 2011-542164; Oct. 26, 2012; 7 pages.
Japanese Office Action; Application No. 2011-542165; Oct. 26, 2012; 7 pages.
Korean Office Action; Application No. 10-2011-7016425; Oct. 30, 2012; 9 pages.
Japanese Office Action; Application No. 2011-542177; Oct. 26, 2012; 10 pages.
Rohde & Schwarz; "UMTS Long Term Evolution (LTE) Technology Introduction;" Application Note 1MA111; Sep. 2008; 55 pages.
Yu, Yi, et al.; U.S. Appl. No. 13/216,819, filed Aug. 24, 2011; Title: Multiple-Input Multiple-Output (MIMO) with Relay Nodes.
Cai, Zhijun, et al.; U.S. Appl. No. 13/221,583; filed Aug. 30, 2011; Title: System and Method for Autonomous Combining.
Office Action dated Nov. 8, 2011; U.S. Appl. No. 12/340,412 filed Dec. 19, 2008; 19 pgs.
Office Action dated Sep. 16, 2011; U.S. Appl. No. 12/340,432, filed Dec. 19, 2008; 33 pgs.
Office Action dated Nov. 10, 2011; U.S. Appl. No. 13/216,819, filed Aug. 25, 2011; 19 pgs.
Yu, Yi, et al.; U.S. Appl. No. 13/548,817, filed Jul. 13, 2012; Title: System and Method for Multi-User Multiplexing.
Notice of Allowance dated Aug. 28, 2012; U.S. Appl. No. 12/337,229, filed Dec. 17, 2008; 6 pages.
Notice of Allowance dated Aug. 10, 2012; U.S. Appl. No. 12/340,412, filed Dec. 19, 2008; 17 pgs.
Notice of Allowance dated Sep. 11, 2012; U.S. Appl. No. 12/337,235, filed Dec. 17, 2008; 16 pages.
Office Action dated Aug. 9, 2012; U.S. Appl. No. 12/916,214, filed Oct. 29, 2010; 51 pages.
Notice of Allowance dated Jun. 20, 2012; U.S. Appl. No. 12/340,432, filed Dec. 19, 2008; 23 pages.
Korean Office Action; Application No. 10-2011-7016626; Jul. 17, 2012; 7 pages.
European Examination Report; Application No. 09756080.9; Jun. 15, 2012; 5 pages.
Final Office Action dated Jan. 5, 2012; U.S. Appl. No. 12/340,418, filed Dec. 19, 2008; 22 pgs.
Office Action dated Feb. 17, 2012; U.S. Appl. No. 12/340,412, filed Dec. 19, 2008; 19 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Final Office Action dated Jan. 9, 2012; U.S. Appl. No. 12/337,235, filed Dec. 17, 2008; 26 pgs.
Office Action dated Feb. 1, 2012; U.S. Appl. No. 12/337,222, filed Dec. 17, 2008; 20 pgs.

(56) References Cited

OTHER PUBLICATIONS

Australian Office Action; Application No. 2009333788; Dec. 8, 2011; 3 pages.
Tao, Jeffrey Z., et al.; "Aggregation in 802.16j—Enhanced Concatenation and MPDU Construction"; IEEE C802.16j-06/178r2; Nov. 7, 2006; 18 pages.
Masato, Okuda, et al.; "MAC-PDU Reconstruction at RS"; IEEE C802.16j-07!022; Jan. 8, 2007; 3 pages.
Office Action dated Sep. 13, 2013; U.S. Appl. No. 13/548,817, filed Jul. 13, 2012; 37 pages.
Final Office Action dated Sep. 17, 2013; U.S. Appl. No. 13/216,819, filed Aug. 24, 2011; 22 pages.
Final Office Action dated Sep. 6, 2013; U.S. Appl. No. 13/221,583, filed Aug. 30, 2011; 23 pages.
Office Action dated Sep. 11, 2013; U.S. Appl. No. 13/842,584, filed Mar. 15, 2013; 55 pages.
Chinese Office Action; Application No. 200980156929.0; Aug. 1, 2013; 14 pages.
Chinese Office Action; Application No. 200980157135.6; Jul. 25, 2013; 13 pages.
Chinese Office Action; Application No. 200980156891.7; Jul. 19, 2013; 34 pages.
Japanese Office Action; Application No. 2011-542163; Jul. 18, 2013; 10 pages.
Chinese Office Action; Application No. 200980156931.8; Jul. 3, 2013; 28 pages.
Canadian Office Action; Application No. 2,747,349; Jul. 12, 2013; 3 pages.
Chinese Office Action; Application No. 200980156892.1; Jul. 23, 2013; 16 pages.
Japanese Office Action; Application No. 2011-542165; Jun. 20, 2013; 7 pages.
Canadian Office Action; Application No. 2,747,377; Aug. 19, 2013; 3 pages.
Office Action dated Mar. 4, 2014; U.S. Appl. No. 13/221,583, filed Aug. 30, 2011; 33 pages.
Final Office Action dated Feb. 28, 2014; U.S. Appl. No. 13/842,584, filed Mar. 15, 2013; 9 pages.
Canadian Office Action; Application No. 2,746,635; Jan. 14, 2014; 3 pages.
Japanese Office Action as Received in Co-pending Application No. 2011-540716 on Dec. 13, 2013; 3 pages. (No English translation available).
Chinese Office Action; Application No. 200980156929.0; Feb. 12, 2014; 13 pages.
Japanese Office Action as Received in Co-pending Application No. 2013-066527 on Jan. 23, 2014; 2 pages (No English translation available).
Yu, Yi, et al.; U.S. Appl. No. 14/298,629, filed Jun. 6, 2014; Title: System and Method for Multi-User Multiplexing.
Notice of Allowance dated Mar. 17, 2014; U.S. Appl. No. 13/548,817, filed Jul. 13, 2012; 33 pages.
Office Action dated May 23, 2014; U.S. Appl. No. 13/716,839, filed Dec. 17, 2012; 76 pages.
Advisory Action dated Apr. 17, 2014; U.S. Appl. No. 13/842,584, filed Mar. 15, 2013; 2 pages.
Office Action dated May 16, 2014; U.S. Appl. No. 13/865,810, filed Apr. 18, 2013. 31 pages.
Chinese Office Action as Received in Co-pending Application No. 200980149651.4 on May 6, 2014; 3 pages (No English translation available).
Canadian Office Action; Application No. 2,747,593; May 28, 2014; 4 pages.
Canadian Office Action; Application No. 2,747,339; May 6, 2014; 2 pages.
Chinese Office Action; Application No. 200980156892.1; Apr. 2, 2014; 20 pages.
Final Office Action dated Jul. 10, 2014; U.S. Appl. No. 13/221,583, filed Aug. 30, 2011; 19 pages.
Notice of Allowance dated Jun. 23, 2014; U.S. Appl. No. 13/716,839, filed Dec. 17, 2012; 10 pages.
Canadian Office Action; Application No. 2,747,349; Jun. 4, 2014; 3 pages.

\* cited by examiner

METHOD AND APPARATUS FOR DISCOVERY OF RELAY NODES

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
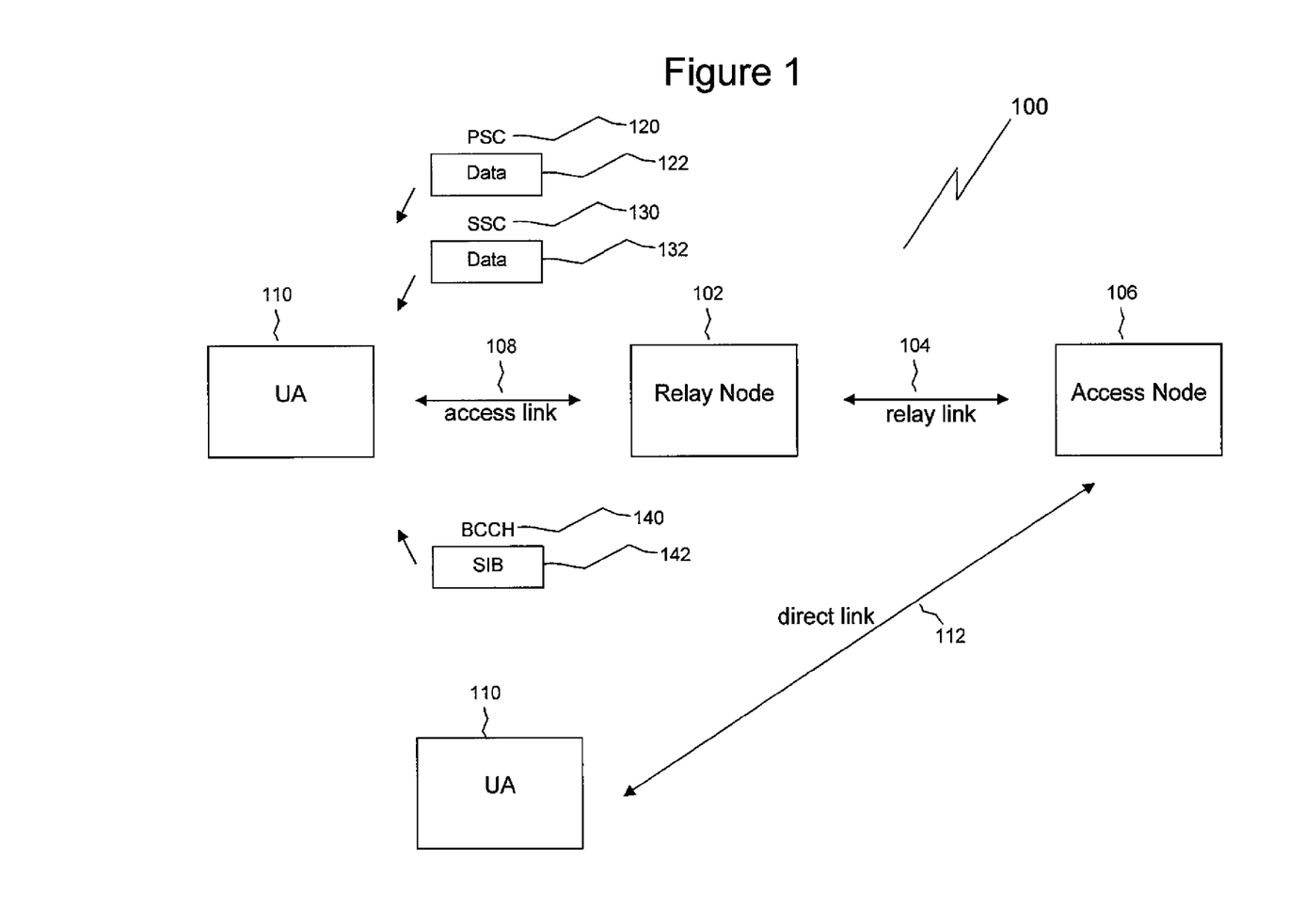
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks, such as LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

Both the relay node 102 and the access node 106 transmit signals, such as synchronization signals, reference signals, or other control signals. In the typical example, these signals are broadcast within the coverage area for the transmitting node. When the UA 110 detects such signals, the UA 110 might begin communicating with the access node 106 either over the direct link 112 or via the relay node 102 over the access link 108. When the UA 110 is far from the access node 106 or the channel conditions between the UA 110 and the relay node 102 are more suitable, it is typically preferable that the UA 110 communicate with the access node 106 via the relay node 102 rather than communicate with the access node 106 over the direct link 112. Therefore, if the UA 110 determines that it is in the coverage area of the relay node 102, the UA 110 may communicate with the access node 106 via the relay node 102. The present disclosure discusses embodiments that allow the UA 110 to make such a determination.

In one embodiment, a UA uses information associated with the identity of a network node to determine whether a transmitter is a relay node or an access node. In a typical scenario, both relay nodes and access nodes transmit signals over a primary synchronization channel (PSC) 120 and a secondary synchronization channel (SSC) 130. A combination of PSC data 122 and SSC data 132 may comprise the network node's identity, which may be referred to as the "Node ID" or "cell ID." When a UA receives the PSC data 122 and SSC data 132, the UA can determine the Node ID of the network node. In one variation of this embodiment, the range of possible identities derived from the combination of PSC data 122 and SSC data 132 is divided into two subsets. One subset of identities is used for the Node IDs of relay nodes and the other subset is used for the Node IDs of access nodes. When a UA determines the Node ID of a network node, the UA can determine whether the network node is an access node or relay node based on the subset that includes the Node ID.

Using this solution, it may be possible for Node IDs to be reused within a wireless network, depending on the geographical distance between the network nodes. Generally, access nodes will transmit with more power than relay nodes, and a relatively large geographic distance may be required between an access node and another network node using the same Node ID. Relay nodes may transmit with less power and therefore may be relatively closer to other network nodes with the same Node ID. In either case, network nodes with the same Node ID should be sufficiently distant that a network node or a UA cannot detect the same Node ID from more than one network node at the same time.

In a variation of this embodiment, one or more bits in the Node ID are used to specify whether the transmitter that sent the PSC data 122 and SSC data 132 was a relay node or an access node. For example, a bit in the Node ID could be set to "0" for relay nodes or "1" for access nodes, or vice versa. The UA could determine whether a transmitter was a relay node or an access node by reading this bit. In another variation of this embodiment, a range of data in the SSC 130 is divided into two subsets, one for relay nodes and one for access nodes. The UA could determine which subset the SSC data 132 belongs to and thus determine whether the transmitter that sent the SSC data 132 was a relay node or an access node. In another variation of this embodiment, a range of data in the PSC 120 is divided into two subsets, one for relay nodes and one for access nodes. The UA could determine which subset the PSC data 122 belongs to and thus determine whether the transmitter that sent the PSC data 122 was a relay node or an access node.

In another embodiment, data in the broadcast control channel (BCCH) 140 transmitted by an access node is used to specify the identities of the relay nodes that are in or near the cell covered by the access node. More specifically, the system information block (SIB) 142 in the BCCH 140 can include a list of Node IDs of the relay nodes in the cell's neighborhood. When a UA receives the BCCH 140, it can read this list of Node IDs and measure the received reference signal power from one or more of the listed relay nodes. In addition to the signal power measurements, the UA may retrieve other information about the relay node, such as metadata broadcast by the access node. The UA may use the collected measurements or information to select an access link to connect to the relay node. In a variation of this embodiment, the UA may send the measurement reports or metadata to the access node over a direct link, and then the access node may guide the UE to connect to a particular relay node. In a variation of this embodiment, one or more bits in the BCCH 140 are used to specify whether the network node that sent the BCCH 140 was a relay node or an access node. For example, a bit in the BCCH 140 could be set to "0" for relay nodes or "1" for access nodes, or vice versa.

In another embodiment, an access node provides a UA with a list of nearby relay nodes in a setup message that the access node sends to the UA. When a UA is attempting to connect to a network node, it typically transmits a random access (RA) message or preamble that can be received by a network node. Upon receiving a RA message or preamble, a network node grants a resource to the UA that sent the RA message or preamble. The UA uses the resource to send a connection-request message to the network node. The network node then responds by sending a connection-setup message to the UA. In this embodiment, the access node includes in the connection-setup message a list of Node IDs of one or more relay nodes that are in or near the cell covered by the access node. The connection-setup message might include an indication that the UA is either allowed or required to utilize a relay node in the list. Upon receiving the connection-setup message, the UA can read the list of Node IDs and measure the received reference signal power or other metadata about one or more of the listed relay nodes and then select an access link to connect to a relay node in the list.

Figure 2:
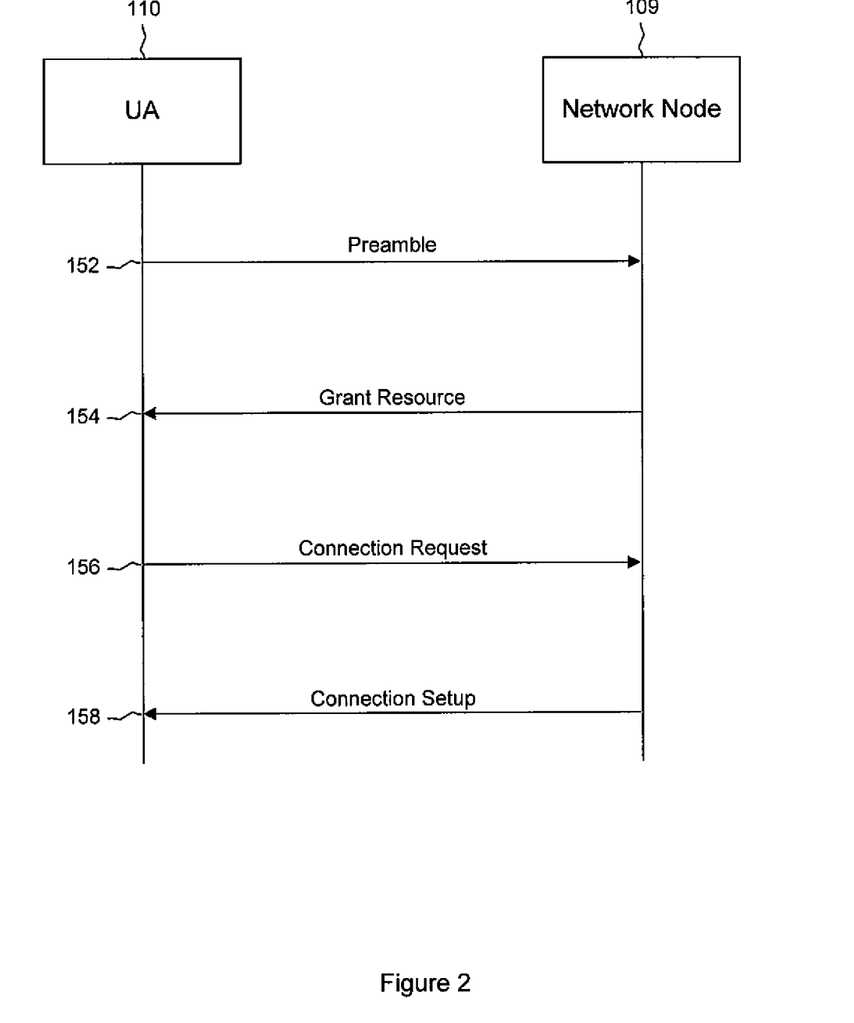
FIG. 2 is a message diagram for a connection setup procedure according to an embodiment of the disclosure.

This embodiment is illustrated in FIG. 2, where the UA 110 is communicating with a network node 109, which might be the relay node 102 or the access node 106. At event 152, the UA 110 sends a preamble to the network node 109. At event 154, the network node 109 grants a resource to the UA 110. At event 156, the UA 110 uses the resource to send a connection request message to the network node 109. At event 158, the network node 109 sends a connection setup message to the UA 110. The connection setup message can include a list of Node IDs of one or more relay nodes to which the UA 110 might connect.

In a variation of this embodiment, the connection-setup message might also include an instruction from the access node for the UA to connect to a specific relay node. Upon receiving the connection-setup message, the UA can connect to an access link for that relay node. In another variation of this embodiment, a layer three relay node may receive the RA message or preamble and initiate radio resource control functions on behalf of the access node. This may provide a slight battery savings by reducing the power used by the UA to transmit the RA message or preamble. Upon receiving the RA message or preamble, the layer three relay node may respond with similar connection-setup messages described herein.

In another embodiment, the absence of a BCCH can indicate to a UA that a network node is a relay node. That is, it can be assumed that an access node will always transmit a BCCH but that a relay node may or may not transmit a BCCH. Therefore, if a UA receives a PSC, an SSG, or some other control signal from a network node but does not receive a BCCH from that network node, the UA may assume that the network node is a relay node.

In another embodiment, a network node that transmits data in a subset of available subframes may be assumed to be a relay node. For example, a relay node operating in a time-division mode may transmit data in every other subframe. In another example, the relay node may use a single carrier broken into timeslots, where some of the timeslots are used as the access link and some of the timeslots are used as the relay link. In this embodiment, a UA that detects that a network node is only transmitting access link data in a subset of the resource available may assume that the network node is a relay node operating in a time-division mode.

Figure 3:
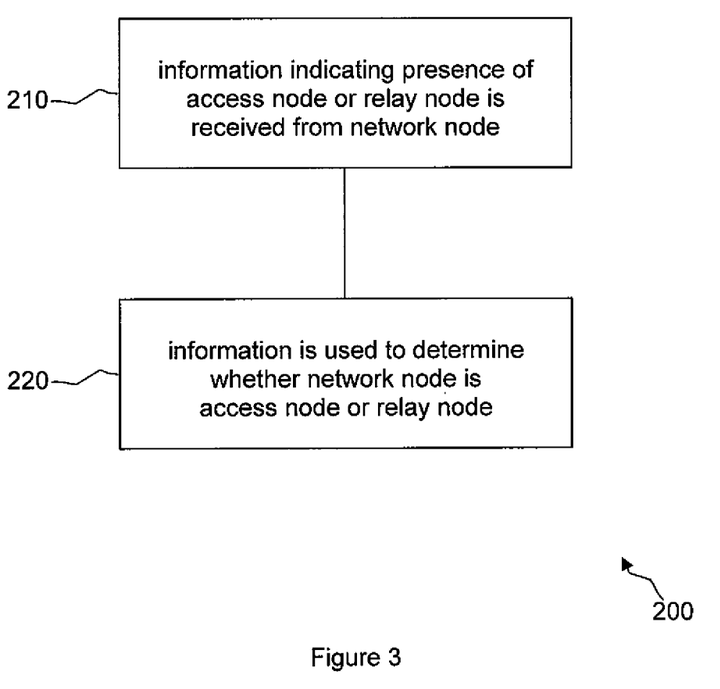
FIG. 3 is a block diagram of a method for determining a presence of a relay node in a wireless communication system according to an embodiment of the disclosure.

FIG. 3 illustrates an embodiment of a method 200 for determining a presence of a relay node in a wireless communication system. In block 210, information indicating the presence of an access node or a relay node is received from a network node. The information might be sent to a UA or might be broadcast. The information might be related to a Node ID, a BCCH, PSC data, SSC data, metadata about the network node, or a connection-setup message. In block 220, the information is used to determine whether the network node is an access node or a relay node.

Figure 4:
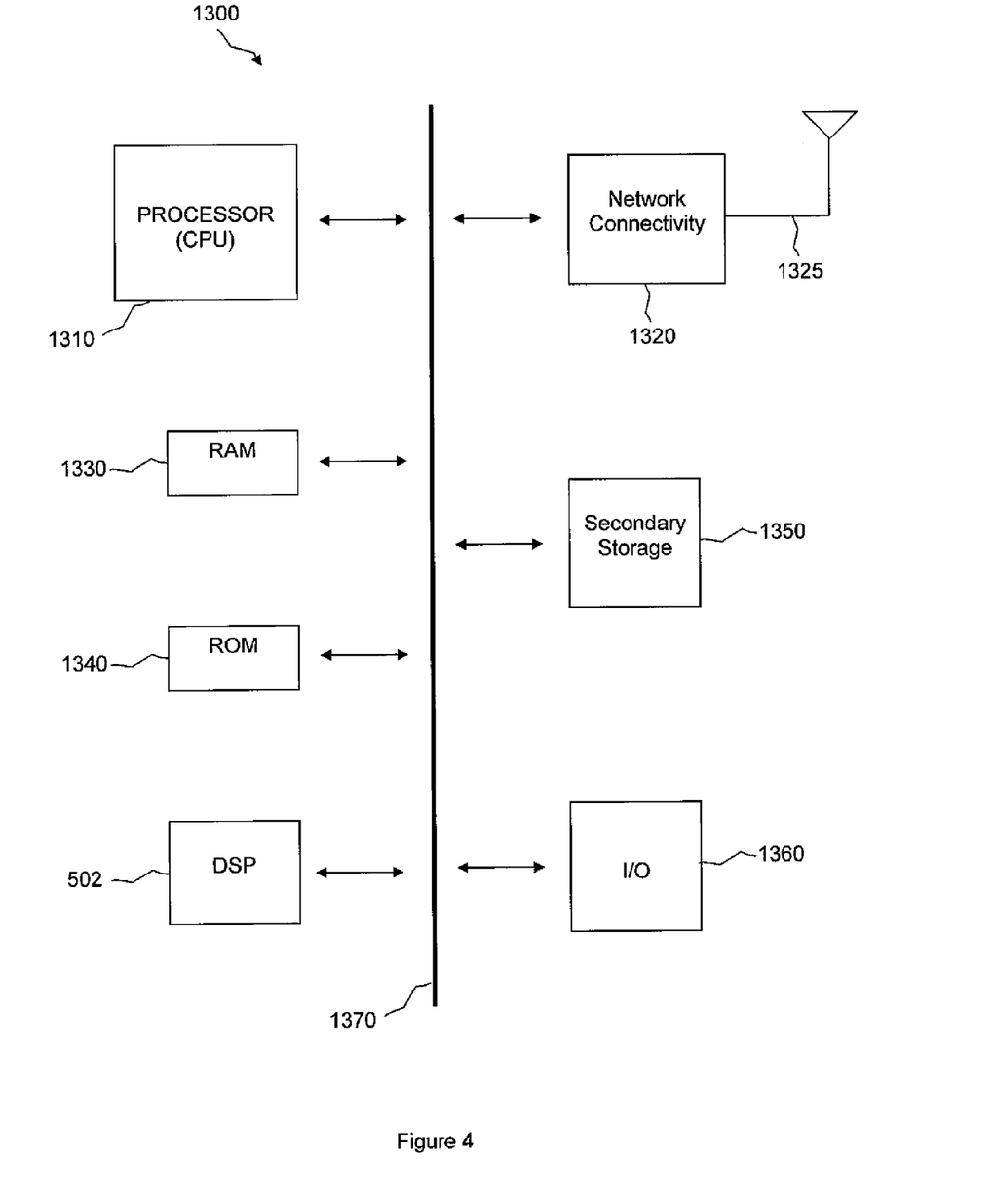
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.813 and 3GPP TS 36.814.

In an embodiment, a method is provided for determining a presence of a relay node in a wireless communication system. The method includes receiving, from a network node in the system, information indicating the presence of at least one of an access node and the relay node. The method further includes determining whether the network node is the one of the access node and the relay node based on the information.

In another embodiment, a user agent is provided that includes a processor configured to receive from a network node in a wireless communication system information indicating the presence of at least one of an access node and a relay node. The processor is further configured to analyze the information to determine whether the component is the one of the access node and the relay node.

In another embodiment, a wireless communication system is provided. The system includes a network node configured to transmit information indicating the presence of at least one of an access node and a relay node. The information is usable to determine whether the component is the one of the access node and the relay node.

In another embodiment, a method is provided for determining that a network node in a wireless communication system is a relay node. The method includes, when information that is present in transmissions from an access node is absent from a transmission from the network node, determining that the network node is a relay node. In various embodiments, a UA, a network, a network component, or a combination of these elements might determine that a network node is a relay node in this manner.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for determining a presence of a relay node in a wireless communications system, wherein the relay node is configured to wirelessly communicate with an access node in the system, the method comprising:
   receiving, by a user agent in the system, information indicating the presence of at least one of the access node and the relay node from a network node in the system, wherein the user agent is not a relay node; and
   determining, by the user agent, whether the network node is the access node or the relay node, based on the information,
   wherein the information comprises a list of node identifiers for at least one relay node in a cell covered by the access node, and wherein the list is included in a connection-setup message sent to the user agent by the access node upon the user agent sending a random access message to the access node.

2. The method of claim 1, wherein the information further comprises range of possible identifiers divided into two subsets, one subset containing at least one identifier for at least one relay node and one subset containing at least one identifier for at least one access node.

3. The method of claim 1, wherein one of the node identifiers in the list contains a bit, one value of which indicates that the network node is the relay node and one value of which indicates that the network node is the access node.

4. A user agent for operating in a wireless communications network including an access node configured to wirelessly communicate with a relay node, comprising:
   a processor configured to receive information indicating a presence of at least one of the access node and the relay node, and further configured to analyze the information to determine whether a network node is the access node or the relay node, wherein the user agent is not a relay node,
   wherein the information comprises a list of relay node identifiers for at least one relay node in a cell covered by the access node, and wherein the list is included in a connection-setup message sent to the user agent by the access node upon the user agent sending a random access message to the access node.

5. The user agent of claim 4, wherein the information further comprises a range of possible identifiers divided into two subsets, one subset containing at least one identifier for at least one relay node and one subset containing at least one identifier for at least one access node.

6. The user agent of claim 4, wherein one of the node identifiers in the list contains a bit, one value of which indicates that the network node is the relay node and one value of which indicates that the network node is the access node.

7. A wireless communications system, comprising:
   a network node configured to transmit a connection setup message including information indicating that the network node is a relay node, the information usable to determine whether the network node is the relay node,
   wherein the connection setup message further includes a list of node identifiers for at least one relay node in a cell covered by an access node,
   wherein the connection-setup message is sent to a user agent by the network node upon the network node receiving a random access message from the user agent.

8. The system of claim 7, wherein the information further includes a range of possible identifiers divided into two subsets, one subset containing at least one identifier for at least one relay node and one subset containing at least one identifier for at least one access node.

9. The system of claim 7, wherein one of the node identifiers in the list contains a bit, one value of which indicates that the network node is the relay node and one value of which indicates that the network node is the access node.

10. The system of claim 7, wherein the connection setup message includes an indication that the user agent is allowed or required to utilize a relay node in the list.

11. The system of claim 7, wherein the connection setup message includes an instruction to connect to a specific relay node in the list.

12. A method for determining that a network node in a wireless communications system is a relay node, the method comprising:
   receiving from the network node a connection setup message including a subset of information indicating that the network node is a relay node; and
   determining that the network node is the relay node by using the subset of information,
   wherein the connection setup message further includes a list of node identifiers for at least one relay node in a cell covered by an access node,
   wherein the connection-setup message is sent to a user agent by the network node upon the user agent sending a random access message to the network node.

13. The method of claim 12, wherein the subset of information is not sent via a broadcast control channel.

\* \* \* \* \*

UNITED STATES PATENT AND TRADEMARK OFFICE
CERTIFICATE OF CORRECTION

PATENT NO. : 8,848,594 B2  
APPLICATION NO. : 12/331992  
DATED : September 30, 2014  
INVENTOR(S) : James Earl Womack et al.

Page 1 of 1

It is certified that error appears in the above-identified patent and that said Letters Patent is hereby corrected as shown below:

In the Claims

Column 8, Line 23 should read: "comprises a range of possible identifiers divided into two sub-"

Signed and Sealed this  
Thirtieth Day of December, 2014

Michelle K. Lee  
*Deputy Director of the United States Patent and Trademark Office*